United States Patent

Edele et al.

[11] Patent Number: 5,890,257
[45] Date of Patent: Apr. 6, 1999

[54] WIPER ARM FOR WINDSHIELD-WASHING SYSTEMS ON MOTOR VEHICLES

[75] Inventors: Reinhard Edele; Oldrich Krizek, both of Bietigheim-Bissingen; Eckhardt Schmid, Brackenheim, all of Germany

[73] Assignee: ITT Automotive Europe GmbH, Germany

[21] Appl. No.: 737,705

[22] PCT Filed: Apr. 28, 1995

[86] PCT No.: PCT/EP95/01622

§ 371 Date: Mar. 11, 1997

§ 102(e) Date: Mar. 11, 1997

[87] PCT Pub. No.: WO95/32111

PCT Pub. Date: Nov. 30, 1995

[30] Foreign Application Priority Data

May 20, 1994 [DE] Germany ............... 44 17 714.3

[51] Int. Cl.[6] ............................................. B60S 1/40
[52] U.S. Cl. ................. 15/250.32; 15/250.23; 403/326
[58] Field of Search ............. 15/250.32, 250.23, 15/250.351, 250.352, 250.31; 403/165, 161, 326

[56] References Cited

FOREIGN PATENT DOCUMENTS

| 182631 | 7/1955 | Austria | 15/250.23 |
| 2404274 | 8/1975 | Germany | 15/250.32 |
| 2622437 | 12/1977 | Germany | 15/250.32 |
| 2743086 | 3/1978 | Germany | 15/250.32 |
| 2753117 | 6/1979 | Germany | 15/250.32 |
| 2816206 | 10/1979 | Germany | 15/250.32 |
| 1234040 | 6/1971 | United Kingdom | 15/250.23 |

*Primary Examiner*—Gary K. Graham
*Attorney, Agent, or Firm*—J. Gordon Lewis

[57] ABSTRACT

A windshield-washing system with a wiper rod manufactured from flat strip steel of defined width and thickness that supports, at its free end, a bearing device with a bearing bushing for an articulation pin and oriented perpendicular to the width. For an economical production of such wiper arms with flawless functionality, the bearing device, consisting of a bearing bushing with laterally projecting fastening sleeve, is produced as a plastic part, pushed onto the free end of the wiper rod and locked in place thereon.

11 Claims, 4 Drawing Sheets

FIG 5
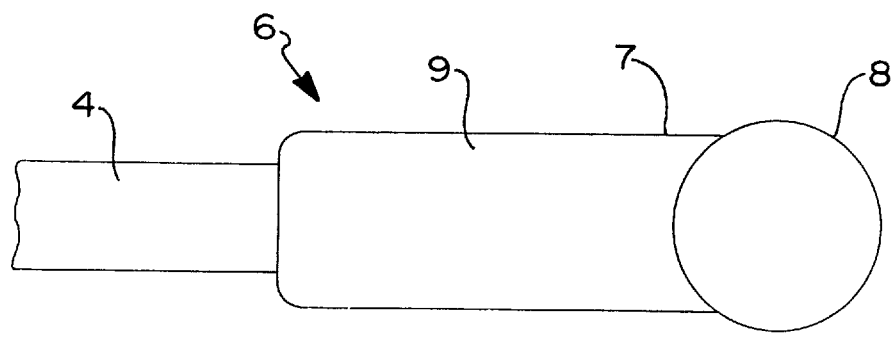
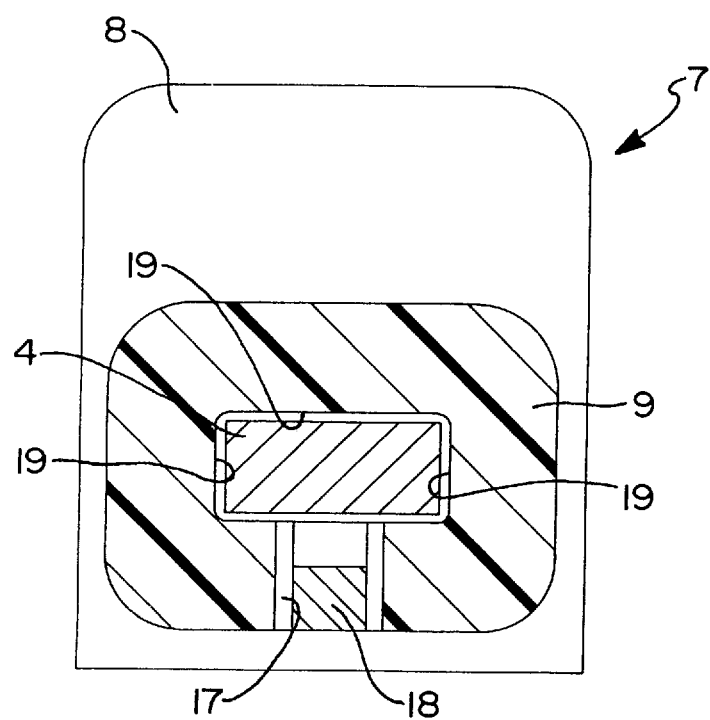
FIG 6

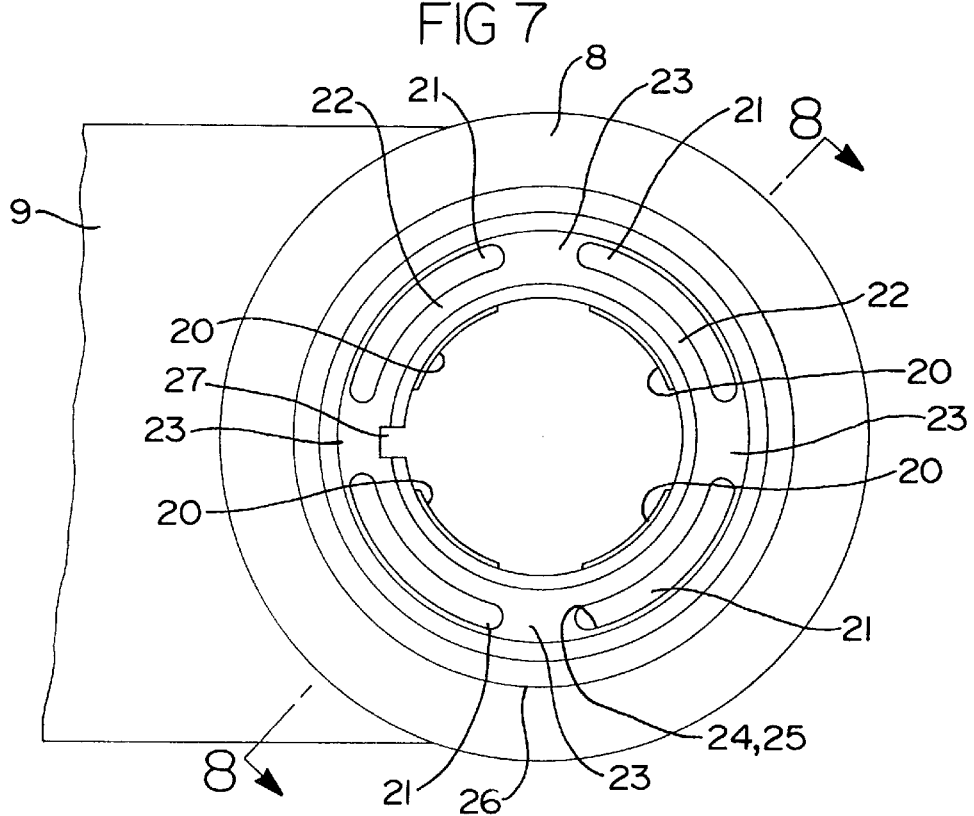
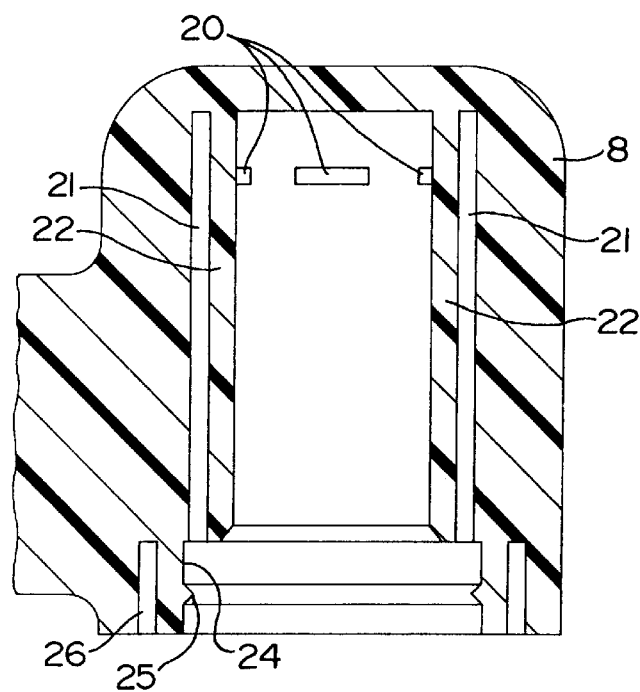

WIPER ARM FOR WINDSHIELD-WASHING SYSTEMS ON MOTOR VEHICLES

TECHNICAL FIELD

The invention relates to a wiper arms for windshield-washing systems of motor vehicles.

BACKGROUND OF THE INVENTION

Windshield-washing systems for motor vehicles are known in which the wiper blade is moved essentially back and forth parallel to itself (at a an unchanging orientation) over the windshield to be cleaned. In such windshield-washing systems a wiper arm and a guide arm oriented parallel to it are used to form a parallelogram by means of a coupling element, with the wiper blade being suspended on this coupling element. Typically two, spaced apart, bearing bolts are provided on this coupling element, housed in a bearing bushing at the end of the wiper arm or the guide arm, respectively.

In a wiper system of this type known from DE-OS 39 17483, in which the driven wiper arm and the guide arm are constructed identically and have, in each case, a fastening part, a joint part and a wiper rod fastened to this joint part and made of flat strip steel of defined width and thickness, the free end of the wiper rod is broadened by a stamping process. After the stamping process, a housing opening is made in the broadened section of the wiper rod by punching, and finally a bearing bushing with or without an internal bushing is inserted by wobble-riveting or rolling.

Although such a wiper arm can be economical, particularly by combining different machining steps, such as cutting the wiper arm to length from flat strip steel and simultaneous stamping of the broadened arm of the wiper rod, several problems have resulted. Due to cold-forming, the material of the wiper rod becomes much stronger in the broadened area, so that the service lives of the tools for punching the housing opening are relatively short, which in turn leads to a cost increase. Also the insertion of the bearing bushing in the housing opening is complicated.

The present invention overcomes these problems by providing an improved wiper arm which can be produced economically without its functionality suffering.

The invention is based essentially on the consideration that the bearing bushing oriented across the width of the wiper rod is a component of a bearing device produced as a plastic part, with the bearing bushing having an elongated, laterally projecting fastening sleeve with which the bearing device is press-fit onto the free end of the wiper rod and locked in place. Such products can be produced extremely cheaply today as mass-production items, with injection molding being particularly suited of an overall single-piece production of such a plastic part.

The wiper rod itself is likewise very simple to produce. The wiper rod material need only be cut to length from the flat strip steel supplied in meter lengths or as a roll. If an appropriately designed cutting/stamping tool is used, a catch means for the fastening sleeve of the bearing device can be produced on the free end of the wiper rod during the separation process.

The assembly process of the bearing device at the free end of the wiper rod is advantageously simple in a single work step. Moreover, there is the possibility, if desired, of removing the entire bearing device without great effort and replacing it with a new one.

In order to permit a simple and uncomplicated engagement of the bearing device with the attachment sleeve on the free end of the wiper rod, it is recommended that at least one catch element, especially in the form of a catch spring or a flexible tongue, be provided on the attachment sleeve; when pushing the engagement sleeve onto the wiper rod end, it automatically moves into engagement with a corresponding catch element, preferably a pressed-out catch lug on the wiper rod end.

In order to guarantee a proper guidance of the wiper blade, the bearing device should be fastened tightly and as free of play as possible to the wiper rod. Hence, according to an advantageous design, inward-projecting profiles are provided on the inside of the attachment sleeve with a free cross section corresponding essentially to the cross section of the wiper rod, particularly to compensate for tolerances.

If, according to another design of the solution according to the invention, the bearing bushing is constructed in a pot shape, the closed end of the bearing bushing is protected from the ingress of dirt and moisture without the need for any special measures for this purpose. Unlike wiper arms of the prior art, protection is thus guaranteed without having to machine an extra circumferential groove in the outer side of the bearing bushing in which a special plastic cap must then be clipped in.

The bearing bushing of the bearing device fastened to the wiper rod is intended to house an articulation pin, with an axial positional retention of the articulation pin with respect to the bearing bushing, or conversely of the bearing bushing with respect to the articulation pin, required for the secure functioning of the bearing. In contrast to the solution cited as prior art, in which a lock washer arranged in an annular groove of the articulation pin provides an axial position retention, the bearing device is to be locked into place on the articulation pin or on the component supporting the articulation pin, according to one design of the solution according to the invention. To this end the bearing device has corresponding catch elements, which can be brought into engagement with corresponding catch elements on the articulation pin or on the respective component.

Such catch elements can advantageously be segments of an annular lip which are directed radially inwards on the inside of the bearing bushing and can be brought into engagement with a corresponding annular recess in the outer surface of the articulation pin.

Thus, an axially-retained catch connection between bearing bushing and articulation pin can be produced which guarantees the required ability of the articulation pin to be twisted inside the bearing bushing.

According to another advantageous design, the radial yielding of the segments of the annular lip should be guaranteed during the installation of the bearing bushing on the articulation pin, in order to make it easier for the bearing bushing to snap into place on the articulation pin and thus avoid damage, especially to the annular segments. For this purpose, the bearing bushing has segment-shaped relief cuts in the vicinity of the segments of the annular lip and extending from the open end of the pot-shaped bearing busing up to it closed. The segments of the annular lip that act as catch elements are thus located on the inside of wall segments of a hollow cylinder and, upon insertion of the articulation pin, the wall segments are capable of elastic radially outward yielding due to the presence of the relief cuts. This also makes possible a nondestructive disassembly of the bearing connection with sufficiently cautious application of force in the axial direction of the bearing bushing or the articulation pin.

In case a pot-shaped bearing bushing is used, one end of the bearing bushing is already protected from the infiltration of dirt or water which might be detrimental to the smooth running of the friction bearing. In order to ensure such protection for the friction bearing on the open end of the bearing bushing as well, the bearing bushing has an expanded cylindrical opening at its open end. On the wall of this expanded cylindrical opening, an annular sealing lip is provided, preferably molded in one piece onto the inside of this opening. This sealing lip could, of course, also be replaced by a sealing ring inserted into an annular groove. Upon engagement of the bearing bushing on the articulation pin, the sealing lip comes into sealing contact with an expanded cylindrical base component of the articulation pin.

In order that, on the one hand, a sufficient seal is guaranteed, but, on the other hand, an excessive radial contact pressure of the sealing lip does not lead to sluggishness of the friction bearing, it is advantageous if the bearing bushing has a continuous annular groove, axially open and arranged coaxially to the expanded cylindrical opening. This annular groove, which acts as a relief cut, permits an elastic radial yielding of the annular sealing lip. The sealing lip is thus located in a certain sense on the inside of a hollow cylindrical wall that is elastically expandable to a certain extent.

The invention will be described in greater detail below on the basis of an embodiment.

BRIEF DESCRIPTIONS OF THE DRAWINGS

FIG. 1 shows a view of the wiper arm, the guide arm and the coupling element of a so-called parallel wiper system.

FIG. 2 a view of the coupling element in an enlarged representation.

FIG. 3 the free end of a wiper rod, viewed from below.

FIG. 4 the free end of a wiper rod, viewed in cross section.

FIG. 5 the free end of a wiper rod, viewed from above.

FIG. 6 a section VI—VI from FIG. 4 in enlarged representation.

FIG. 7 a section of the bearing device in further enlarged representation, seen from below.

FIG. 8 a section along VIII—VIII of FIG. 7.

DETAILED DESCRIPTION OF THE PREFERRED EMBODIMENTS

Figure 1:
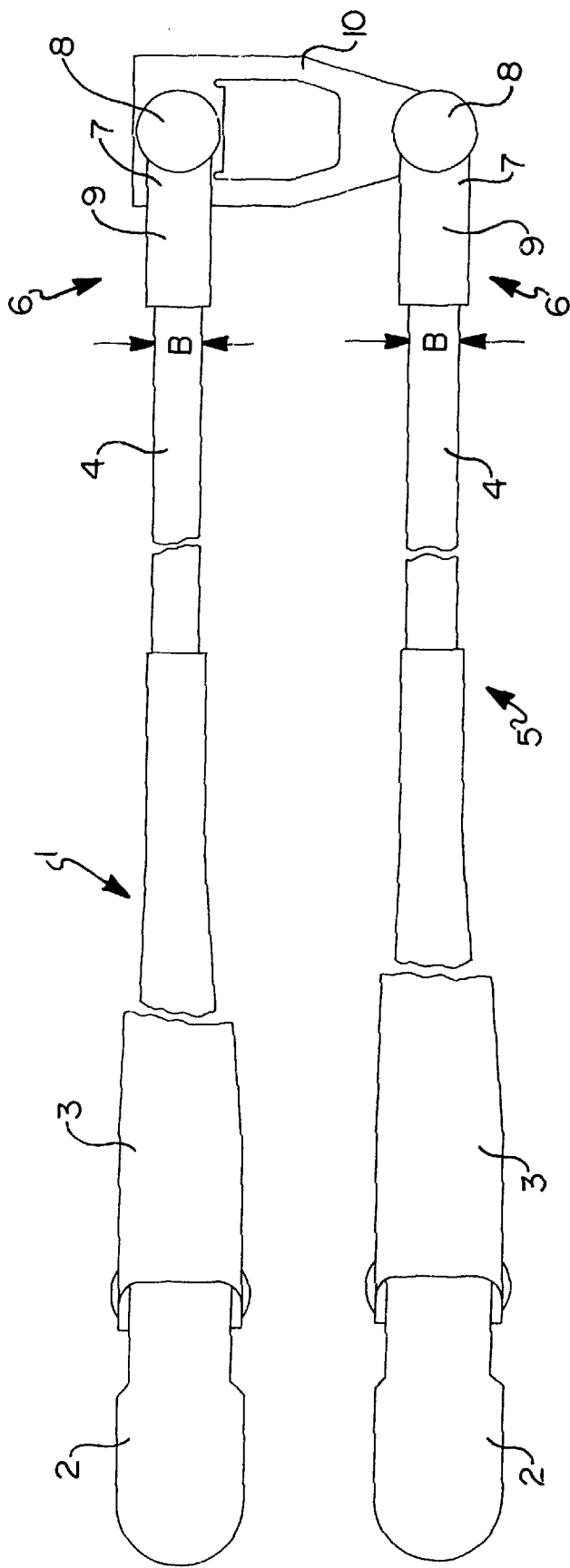

In FIG. 1, 1 designates the driven wiper arm of a windshield-washing system, to which, in a known manner, a fastening part 2, an articulation part 3 and a wiper rod 4 are attached. The guide arm, labeled 5 as a whole, is constructed similarly. Each wiper rod 4 is produced from flat strip steel of a defined width B and a defined thickness D and fastened at one side to the articulation part 3. At the free end 6 of each wiper rod 4, a bearing device 7 is arranged and locked in place on the wiper rod 4. The bearing device 7 is a plastic part produced in one part by injection molding and consisting essentially of a pot-shaped bearing bushing 8 with a laterally projecting fastening sleeve 9.

The two wiper rods 4, that is, both wiper arm 1 as well as guide arm 5, are linked together so as to be able to pivot via the bearing devices 7 at a coupling element 10 connecting the free ends 6 of the two wiper rods 4. Here the two bearing bushings 8 are oriented perpendicular to the width B of the wiper rods 4 and each accommodates one articulation pin 11 (FIG. 2) of the two riveted in coupling element 10.

When operating the parallel wiping system, the wiper arm 1 and the guide arm 5 are pivoted in parallel laterally in the plane of the drawing. The wiper arm 1, the guide arm 5 and the coupling element 10 form to a certain extent a changing parallelogram, with the coupling element 10 always remaining essentially parallel to itself. Thereby, a wiper blade, not shown, which is mounted on the coupling element 10 is also moved parallel to itself on the windshield to be cleaned.

Figure 2:
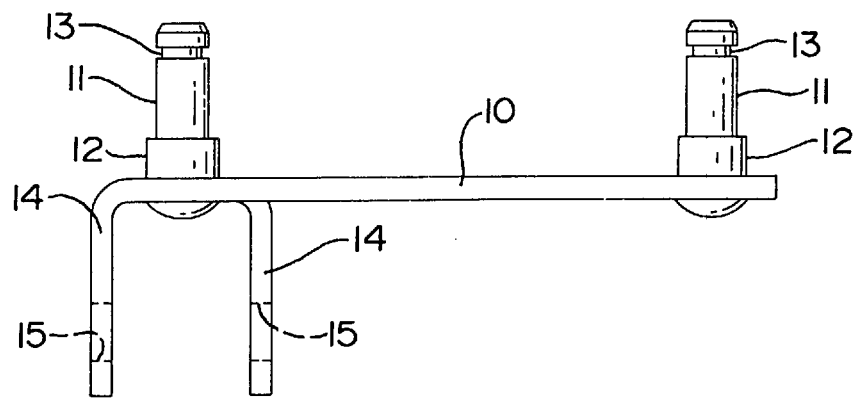

The structure of the coupling element 10, constructed of sheet metal, can be seen from FIG. 2. The articulation pins 11 are riveted onto the sheet metal part of the coupling element 10 in parallel a distance apart. The articulation pins 11 have a widened base part 12, and in the vicinity of the free end opposite the base part an annular groove 13 is cut into the articulation pins 11 and serves as a catch element for the bearing bushing 8. Two sections 14 are bent down perpendicularly from the plane of the metal sheet and form a U-shaped housing which opens towards the bottom, for a wiper blade, which can be articulated to the coupling element 10 by pins, not shown, in the flush holes 15.

Figure 3:
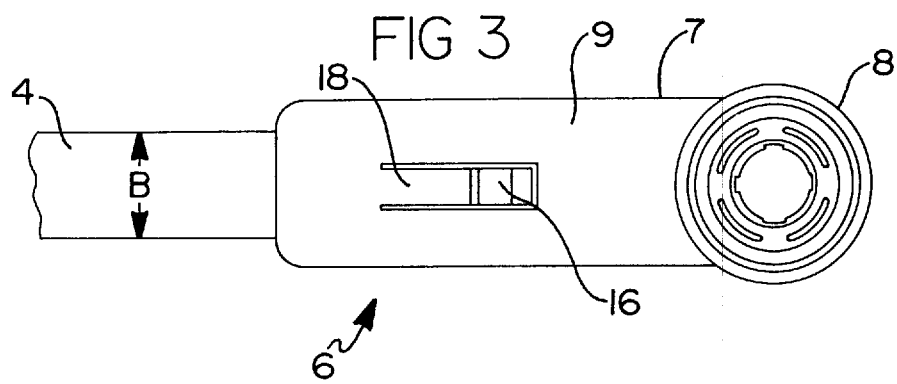
Figure 4:
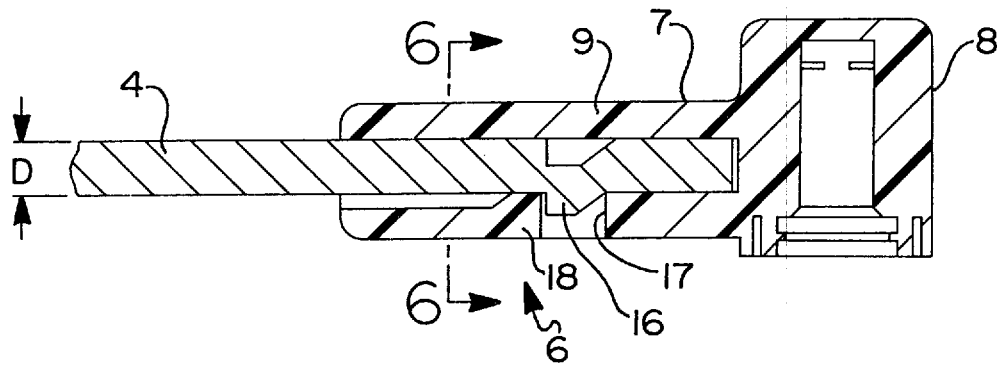

The position and particularly the type of fastening of the bearing device 7 at the free end 6 of the wiper rod 4 can be seen from FIGS. 3–5. The wiper rods 4 of the wiper arm 1 and the guide arm 5, as well as both bearing devices 7 are preferably identical.

The wiper rod 4 is preferably made of flat strip steel with a prescribed width B and thickness D is equipped at its free end 6 with a catch lug 16 which projects downward from its lower side and is produced in a single work step along with the separation of the wiper rod 4 from the starting material. The catch lug 16 has a ramp positioned forward in the insertion direction of wiper rod 4. A housing opening 17 for the catch lug 16 is machined into the lower side of the fastening sleeve 9 and a spring catch 18 that terminates at the opening 17 is also cut free from the lower side of the fastening sleeve 9. At the front in the insertion direction, the spring catch 18 also has a ramp for the catch lug 16 of wiper arm 4.

When inserting the free end 6 of the wiper arm 4 into the fastening sleeve 9 of the bearing device 7, the spring catch 18 is first moved downward and then resumes its initial position behind the rear side of the catch lug 16. The bearing device 7 is held sufficiently securely in place on the free end 6 of the wiper rod 4 by this detachable snap connection.

It can be seen from FIG. 6 that the free cross section of the fastening sleeve 9 essentially corresponds to the cross section of the wiper rod 4. The gap between the wiper rod 4 and the inside of the fastening sleeve 9 is shown in enlarged scale in the drawing, whereas it is actually smaller in practice. To compensate for play occurring essentially because of tolerances, axially-oriented profiled sections 19 projecting inward are provided on the internal sides of the fastening sleeve 9. In this embodiment, a projecting rib extends in the axial direction of fastening sleeve 9 along each interior side of the fastening sleeve 9 as a play-compensating section 19. In order to safely rule out a tilting of the fastening sleeve 9 and hence of the bearing bushing 8 with respect to the wiper rod 4, several play-compensating profiled sections 19 can be provide along each internal side of the fastening sleeve 9, and they may also extend transversely or in other directions. In the section along VI—VI, the spring catch 18 is also discernible, which in this case essentially covers up the catch lug 16 of wiper rod 4 and the accommodation opening 17 present in the bottom side of fastening sleeve 9 for the catch lug 16.

Details of the bearing bushing 8 can be recognized in FIGS. 7 and 8 because of the enlarged representation. Close to the closed end of the pot-shaped bearing bushing 8, catch members comprised of four segments 20 of an annular lip projecting radially inward can be seen. These segments 20 are designed such that they can engage in the catch element 13 constructed as an annular groove on the articulation pin 11, and thus produce a locking connection between articulation pin 11 and bearing device 7, where the articulation pin 11 can be twisted with respect to the bearing bushing 8 without great exertion. To make the production and separation of the locking connection simple, the bearing bushing 8 has, in the vicinity of each segment 20 of the annular lip, a segment-shaped relief cut 21 extending from the open end of the bearing bushing 8 up to the inner side of the closed end. In the assembly of the bearing bushing 8 on the articulation pin 11 or also in the disassembly, the segments 20 can move elastically outward radially together with the wall segments 22 formed by the relief cuts 21.

This design, in which the segments 20 are arranged near the closed end of bearing bushing 8, has one other special advantage. Namely, conventional coupling elements 10, in which the articulation pin 11 has an annular groove 13 near its free end that can accommodate a locking ring for axial retention of a conventional bearing bushing, can be combined with wiper arms 1 and guide arms 5, respectively, of the invention.

The wall segments 22 obtains sufficient elasticity from the relief cuts 21, while on the other hand, the stability and supporting function of the bearing bushing 8 that is required for proper and safe functioning of the friction bearing is obtained from the remaining wall ridges 23 (between relief cuts 21).

Also visible from FIGS. 7 and 8 is an expanded cylindrical opening 24 at the open end of the bearing bushing 8 having a circumferential annular sealing lip 25 on its inside. With an articulation pin 11 inserted into the bearing bushing 8, this sealing lip 25 makes sealing contact with the expanded cylindrical base part 12 of the articulation pin 11 and prevents dirt and moisture from entering the interior of the friction bearing. A circumferential annular groove 26, arranged coaxially with the expanded cylindrical opening 24 and open to the end surface, permits an elastic radial movement of the annular sealing lip 25. The expanded base part 12 of the articulation pin 11 has a slight excess dimension in relation to the free cross section in the vicinity of the sealing lip 25. This ensures a secure seal without essentially influencing the smooth running of the articulation pin 11 in the bearing bushing 8. It is possible to forgo additional sealing measures.

In practice it is generally customary to provide such pivot bearings with a permanent lubrication. For this purpose, the articulation pin 11 or the interior of the bearing bushing 8 is greased before the assembly process. In order to allow the air cushion which is present in the interior of the bearing bushing 8 and which tends to become compressed to escape during the mounting of the bearing bushing 8 on the articulation pin 11, an air-escape groove 27 is cut in the area of a connecting ridge 23, as can be seen from FIG. 7. After the escape of the air, grease may accumulate in this air-escape groove 27, with which this air-escape groove 27 fulfills the function of a lubricant reservoir. For additional improvement of the permanent lubrication, several air-escape grooves 27 may be cut into the sliding surface across the periphery of the bearing bushing 8.

We claim:

1. Wiper arm for windshield-washing systems on motor vehicles, comprising:
    a wiper rod having first and second end portions, an articulation part connected to said first end portion of said wiper rod,
    a bearing device connected to said second end portion of said wiper rod wherein,
    the bearing device is a plastic component and includes a bearing bushing having an elongated, laterally projecting fastening sleeve with which the bearing device is inserted over a free end of the wiper rod and locked in place thereon,
    wherein the bearing device possesses catch members for axially fixing the bearing bushing on an articulation pin, and
    wherein the bearing bushing has relief cuts proximate the catch members which extend from an open end to the inside of a closed end of the bearing bushing to permit an elastic yielding of the catch members.

2. Wiper arm according to claim 1, wherein the fastening sleeve has at least one resilient catch, which engages with a catch lug, on the wiper rod.

3. Wiper arm according to claim 1, wherein a free cross section of the fastening sleeve corresponds to a cross section of the wiper rod, with inward-projecting profiles for compensation of play between fastening sleeve and wiper rod provided on interior sides of the fastening sleeve.

4. Wiper arm according to claim 1, wherein the bearing bushing is constructed in a pot shape.

5. Wiper arm according to claim 1, wherein the catch members include segments of a radially inward directed annular lip that can be brought into engagement with a corresponding annular recess in an outer surface of the articulation pin.

6. Wiper arm according to claim 5, wherein the relief cuts are proximate said segments of said annular lip.

7. Wiper arm according to claim 6, wherein the bearing bushing has an expanded cylindrical opening which includes an annular sealing lip which makes sealing contact on an expanded base part of the articulation pin.

8. Wiper arm according to claim 7, wherein the bearing bushing has an annular groove, open towards the end surface and arranged coaxially to the expanded cylindrical opening, that permits an elastic radial yielding of the annular sealing lip.

9. Wiper arm according to claim 8, wherein the bearing device is produced in one piece as an injection-molded part.

10. Wiper arm for windshield-washing systems on motor vehicles, comprising:
    a wiper rod having first and second end portions, an articulation part connected to said first end portion of said wiper rod,
    a bearing device connected to said second end portion of said wiper rod wherein,
    the bearing device is a plastic component and includes a pot-shaped bearing bushing having an elongated, laterally projecting fastening sleeve with which the bearing device is inserted over a free end of the wiper rod and locked in place thereon,
    wherein an articulation pin is disposed within the bearing bushing, and wherein the bearing device possesses catch members for the axial fixation of the bearing bushing on the articulation pin, the catch members including segments of radially inward directed annular lips that can be brought into engagement with a correspondingly annular recess in an outer surface of the articulation pin, and
    the bearing bushing has relief cuts proximate said segments of said annular lips which extend from an open end to the inside of a closed end of the pot-shaped bearing bushing and permit an elastic yielding of the segments in the mounting of the bearing bushing on the articulation pin.

11. Wiper arm for windshield-washing systems on motor vehicles, comprising:
  a wiper rod having first and second end portions, an articulation part connected to said first end portion of said wiper rod,
  a bearing device connected to said second end portion of said wiper rod wherein,
  the bearing device is a plastic component and includes a bearing bushing having an elongated, laterally projecting fastening sleeve with which the bearing device is inserted over a free end of the wiper rod and locked in place thereon, and
  wherein the bearing bushing has an expanded cylindrical opening which includes an annular sealing lip which makes sealing contact on an expanded base part of an articulation pin, the bearing bushing further including an annular groove, open towards an end surface and arranged coaxially to the expanded cylindrical opening, that permits an elastic radial yielding of the annular sealing lip.

* * * * *